(12) United States Patent
Malkin et al.

(10) Patent No.: US 8,804,798 B2
(45) Date of Patent: Aug. 12, 2014

(54) TRANSCEIVER SPECTRUM CONTROL FOR CROSS-TALK MITIGATION

(75) Inventors: Moshe Malkin, Mountain View, CA (US); Jose Tellado, Mountain View, CA (US)

(73) Assignee: Aquantia Corporation, Milpitas, CA (US)

( * ) Notice: Subject to any disclaimer, the term of this patent is extended or adjusted under 35 U.S.C. 154(b) by 279 days.

(21) Appl. No.: 13/235,283

(22) Filed: Sep. 16, 2011

(65) Prior Publication Data

US 2013/0070823 A1    Mar. 21, 2013

(51) Int. Cl.
*H04B 1/38*   (2006.01)
*H04L 27/28*  (2006.01)

(52) U.S. Cl.
USPC .......................................... 375/222; 375/260

(58) Field of Classification Search
USPC .................... 375/219, 220, 222, 260, 285
See application file for complete search history.

(56) References Cited

U.S. PATENT DOCUMENTS

| | | | |
|---|---|---|---|
| 5,680,400 | A | 10/1997 | York |
| 6,052,385 | A | 4/2000 | Kanerva |
| 6,081,523 | A | 6/2000 | Merchant et al. |
| 6,121,890 | A | 8/2000 | Rao |
| 6,195,360 | B1 | 2/2001 | Raza et al. |
| 6,377,640 | B2 | 4/2002 | Trans |
| 6,467,092 | B1 | 10/2002 | Geile et al. |
| 6,532,277 | B2 | 3/2003 | Ulanskas et al. |
| 6,922,448 | B1 | 7/2005 | Jacobsen et al. |
| 7,027,407 | B2 | 4/2006 | Diepstraten et al. |
| 7,106,833 | B2 | 9/2006 | Kerpez |
| 7,113,491 | B2 | 9/2006 | Graziano et al. |
| 7,158,563 | B2 | 1/2007 | Ginis et al. |
| 7,324,511 | B2 | 1/2008 | Nishihara |
| 7,353,007 | B2 | 4/2008 | Carballo et al. |
| 7,525,992 | B1 | 4/2009 | Shachal |
| 7,567,620 | B2 | 7/2009 | Rozental |
| 7,593,431 | B1 | 9/2009 | Lo et al. |
| 7,664,254 | B2 | 2/2010 | Bostoen et al. |

(Continued)

FOREIGN PATENT DOCUMENTS

WO    WO00/21204    4/2000

OTHER PUBLICATIONS

Zimmerman et al., IEEE Power Backoff, Solarflare,Teranetics, Feb. 19, 2005, 12 pages.
Zimmerman et al., IEEE Power Backoff, Mar. 15, 2005, 16 pages.

(Continued)

*Primary Examiner* — Don N Vo
(74) *Attorney, Agent, or Firm* — Lance Kreisman; Peninsula Patent Group

(57) ABSTRACT

Embodiments of methods, apparatuses, and systems for pre-processing a transmit signal of a transceiver are disclosed. One method includes estimating parameters of a communication link between the transceiver and a link partner transceiver, estimating cross-talk coupling of the transceiver to at least one other transceiver, and adjusting at least one of a transmit power or a transmit signal waveform based on the estimated parameters and estimated cross-talk. One apparatus includes a transceiver that is operative to obtain parameters of a communication link between the transceiver and a link partner transceiver, and to obtain a representation of cross-talk coupling of the transceiver to at least one other transceiver. Further, a controller of the transceiver is operative to adjust at least one of a transmit power level or a transmit signal waveform based on the estimated parameters and estimated cross-talk.

33 Claims, 11 Drawing Sheets

(56) References Cited

U.S. PATENT DOCUMENTS

| | | | |
|---|---|---|---|
| 7,693,240 B2 | 4/2010 | Mezer et al. | |
| 7,697,408 B2 | 4/2010 | Schneider et al. | |
| 7,711,530 B2 * | 5/2010 | Cioffi et al. | 703/2 |
| 7,720,075 B2 | 5/2010 | Costo | |
| 7,738,482 B2 | 6/2010 | Thousand et al. | |
| 7,782,852 B2 | 8/2010 | Tellado et al. | |
| 7,936,778 B2 | 5/2011 | Ungerboeck et al. | |
| 8,112,646 B2 | 2/2012 | Tsai | |
| 8,196,016 B1 | 6/2012 | Langner et al. | |
| 8,201,005 B2 | 6/2012 | Wertheimer et al. | |
| 8,276,013 B2 | 9/2012 | Diab et al. | |
| 8,320,411 B1 | 11/2012 | Sedarat et al. | |
| 2001/0012321 A1 * | 8/2001 | Terry | 375/227 |
| 2002/0006167 A1 | 1/2002 | McFarland | |
| 2002/0119783 A1 | 8/2002 | Bourlas et al. | |
| 2003/0040298 A1 | 2/2003 | Heatley | |
| 2004/0114503 A1 | 6/2004 | Schneider et al. | |
| 2004/0136463 A1 * | 7/2004 | Tzannes | 375/257 |
| 2004/0184810 A1 | 9/2004 | Spilman et al. | |
| 2005/0030808 A1 | 2/2005 | Brown et al. | |
| 2005/0055467 A1 | 3/2005 | Campana et al. | |
| 2005/0058152 A1 | 3/2005 | Oksanen et al. | |
| 2005/0152466 A1 | 7/2005 | Maltsev et al. | |
| 2005/0245216 A1 | 11/2005 | Boos | |
| 2005/0259685 A1 | 11/2005 | Chang et al. | |
| 2006/0109784 A1 | 5/2006 | Weller et al. | |
| 2006/0153106 A1 | 7/2006 | Laakso et al. | |
| 2006/0153307 A1 | 7/2006 | Brown et al. | |
| 2006/0215561 A1 | 9/2006 | Wang et al. | |
| 2007/0076722 A1 | 4/2007 | Ungerboeck et al. | |
| 2007/0140289 A1 | 6/2007 | Tellado et al. | |
| 2007/0162818 A1 | 7/2007 | Shen et al. | |
| 2007/0192505 A1 | 8/2007 | Dalmia | |
| 2007/0248024 A1 | 10/2007 | Conway et al. | |
| 2007/0258514 A1 | 11/2007 | Wajcer et al. | |
| 2007/0269022 A1 * | 11/2007 | Taich et al. | 379/27.01 |
| 2008/0096512 A1 | 4/2008 | Mezer et al. | |
| 2008/0160915 A1 * | 7/2008 | Sommer et al. | 455/63.1 |
| 2008/0187028 A1 | 8/2008 | Lida | |
| 2008/0205609 A1 * | 8/2008 | Zhou | 379/93.08 |
| 2008/0220725 A1 * | 9/2008 | Schedelbeck et al. | 455/69 |
| 2008/0294919 A1 | 11/2008 | Lida et al. | |
| 2009/0080459 A1 | 3/2009 | Barkan et al. | |
| 2009/0150745 A1 | 6/2009 | Langner et al. | |
| 2009/0282277 A1 | 11/2009 | Sedarat | |
| 2010/0027601 A1 * | 2/2010 | Fang | 375/222 |
| 2010/0075704 A1 | 3/2010 | McHenry et al. | |
| 2010/0115295 A1 | 5/2010 | Diab | |
| 2010/0177855 A1 * | 7/2010 | Ashikhmin et al. | 375/346 |
| 2010/0188980 A1 | 7/2010 | Desai et al. | |
| 2011/0142111 A1 | 6/2011 | Sands et al. | |
| 2012/0063295 A1 | 3/2012 | Bliss | |
| 2012/0106345 A1 | 5/2012 | Diab | |
| 2012/0170591 A1 | 7/2012 | Diab et al. | |
| 2012/0188894 A1 | 7/2012 | Huschke et al. | |
| 2013/0070823 A1 | 3/2013 | Malkin et al. | |

OTHER PUBLICATIONS

Ken Christense et al., IEEE 802.3az The Road to Energy Efficient Ethernet, IEEE Communications Magazine, Nov. 2010, 7 Pages.

Hugh Barrass, EEE Exchange of Management Information, IEEE 802.3az EEE Task Force, Mar. 2009, Vancouver, British Columbia, 11 Pages.

* cited by examiner

TRANSCEIVER SPECTRUM CONTROL FOR CROSS-TALK MITIGATION

FIELD OF THE INVENTION

The invention relates generally to network communications. More particularly, the invention relates to methods and apparatuses for controlling transmit power or a transmit signal waveform for mitigation of cross-talk.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100/1000/10G BASE-T form is one of the most prevalent high speed LANs (local area network) for providing connectivity between personal computers, workstations and servers.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

High speed Ethernet networks (including, for example, the Ethernet transceivers of FIG. 1) support full-duplex transmission in a single frequency band. Ethernet transceivers typically co-exist with many other communication systems as well as other Ethernet transceivers. These Ethernet transceivers use a very wide transmission bandwidth and can therefore interfere with other communication systems. Moreover, electromagnetic capacitive and inductive coupling are often much stronger at higher frequencies so that the interference coupling becomes stronger with higher frequencies.

In many Ethernet system deployments, many transceivers are placed close together to achieve cable bundling to efficiently pack and route the Ethernet cables in the plant. Such bundling results in the cables being physically very close to each other and so the cables' receivers suffer from increased interference. Such cross-talk energy coupling appears as an additional distortion source for each receiver and results in worst link margin, performance, and error rate.

Prior approaches are often passive, meaning that they take no action to combat this additional cross-talk distortion and therefore suffered the performance degradation or reduced margin of the system.

Better materials, such as better cable shielding can help reduce the effects of cross-talk. Also, better design of the boards where multiple transceivers reside can also help reduce the effects of cross-talk. Such design can involve the placement and routing of wires and traces that result, for example, in reduced onboard coupling. Similarly, the cables conducting the transmitted information could be designed with better shielding and twisting to reduce the crosstalk that the travelling signals generate. Similarly, the board and package components can be made from higher quality materials resulting in improved cross-talk rejection.

Such approaches are not always possible because of other constraints such as material cost, area, legacy structure, power, and other constraints.

It is desirable to have an apparatus, method, and system for mitigating cross-talk of Ethernet systems that do not require any additional materials and cost, and are compatible with all possible current and future deployments.

SUMMARY OF THE INVENTION

An embodiment includes a method of preprocessing a transmit signal of a transceiver. The method includes estimating parameters of a communications link between the transceiver and a link partner transceiver, estimating cross-talk coupling of the transceiver to at least one other transceiver, and adjusting at least one of a transmit power or a transmit signal waveform based on the estimated parameters and estimated cross-talk.

Another embodiment includes a transceiver. The transceiver is operative to obtain parameters of a communications link between the transceiver and a link partner transceiver, and to obtain a representation of cross-talk coupling of the transceiver to at least one other transceiver. Further, a controller operative to adjust at least one of a transmit power or a transmit signal waveform based on the estimated parameters and estimated cross-talk.

Another embodiment includes a communications system that includes a transceiver and a link partner transceiver.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

Figure 1:
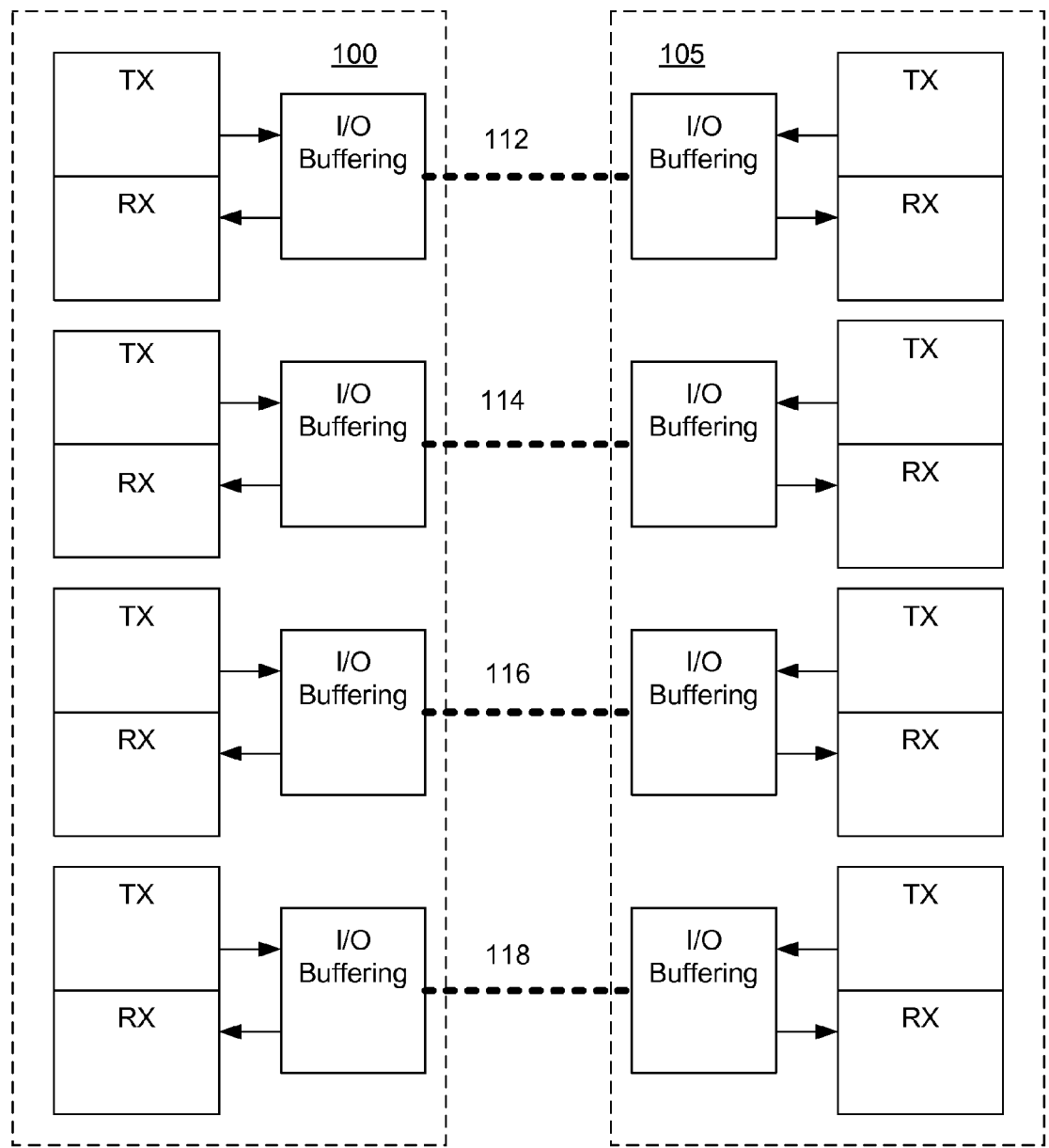
FIG. 1 shows a plurality of prior art Ethernet transceiver pairs.

As shown in the drawings for purposes of illustration, the described embodiments include apparatuses, methods and systems for preprocessing a transmit signal of a transceiver for mitigating the effects of cross-talk. Embodiments include a transceiver adjusting its transmission characteristics and/or functionality to reduce the effects of cross-talk on other transceivers. Other embodiments further include joint coordination of transceiver pairs to reduce cross-talk couplings between transceivers.

At least some of the described embodiments allows for control and mitigation of interference by changing the signal processing of the transmitted waveforms. Such embodiments can be static, but greater benefits can be realized by making the embodiments dynamic and flexible, allowing system employing the embodiments to support a wide range of cross-talk coupling functions. The described embodiments do not require any additional materials and cost and are compatible with all possible deployments. The resulting mitigation of the cross-talk allows for improved link performance and maintenance of system margins.

Figure 2:
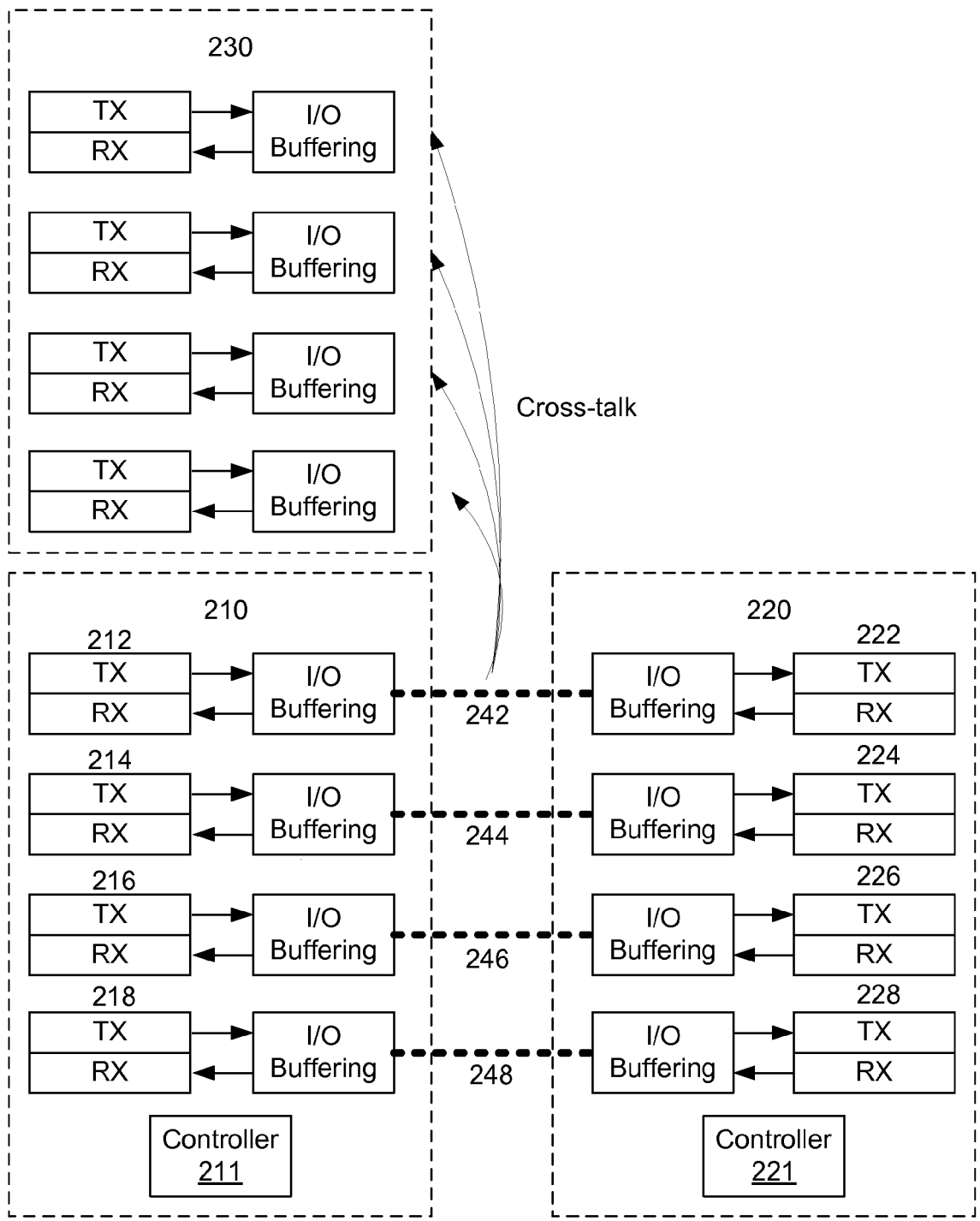
FIG. 2 shows an example of a transceiver, a link partner transceiver and another transceiver, that can utilize the described embodiments for reducing cross-talk.

FIG. 2 shows an example of a transceiver 210, a link partner transceiver 220 and another transceiver 230, that can utilize the described embodiments for reducing cross-talk. Communication links 242, 244, 246, 248 provide communication paths between the transceiver 210 and the link partner transceiver 220. Due to the proximity of the other transceiver 230 to at least one of the transceiver 210, the link transceiver 220, or at least one of the communication links 242, 244, 246, 248, the other transceiver 230 can inadvertently receive electro-magnetic cross-talk coupling energy. If great enough, the cross-talk will interfere with the normal operation of the other transceiver and present an additional distortion to the receiver. Additionally, operation of the other transceiver 230 can cause cross-talk (interference) to interfere with the communication signals between the transceiver 210 and the link partner transceiver 220.

As shown, the transceiver 210 includes multiple (four are shown) sub-transceivers 212, 214, 216, 218 that each include a transmitter (TX) and a receiver (RX). Each of the sub-transceivers is connected (through a corresponding one of the communication links 242, 244, 246, 248) to a link partner sub-transceiver 222, 224, 226, 228. Additionally, the transceiver 210 includes a controller 211 that is operative to control (adjust) a transmit power or a transmit signal waveform of signals transmitted from each of the sub-transceiver 212, 214, 216, 218. As shown the link partner transceiver 220 includes a controller 221.

For embodiments, the controller 211 obtains parameters of a communications link (the communications link can include one or more of the links 242, 244, 246, 248) between the transceiver 210 and the link partner transceiver 220. Further, the controller 211 obtains at least one representation of cross-talk coupling of the transceiver to at least one other transceiver (such as transceiver 230). The controller 211 adjusts at least one of a transmit power or a transmit signal waveform based on the estimated parameters and the representation of the cross-talk.

Generally, the transceiver 210 can reduce the effects of cross-talk by decreasing the power level of signals it transmits across the links 241, 244, 246, 248. For an embodiment, adjusting the transmit power includes decreasing the transmit power if the signal quality is above a threshold. The threshold can be set at a level that provides acceptable quality of transmission of data between the transceiver and the link partner transceiver 220. For example, if the link partner transceiver 220 has x decibels (dB) of Signal-to-Noise-Ratio (SNR) margin, then the received power of transceiver 220 from transceiver 210 can be reduced by approximately x dB while still maintaining the SNR above a required threshold. Such a reduction in the transmitted power by approximately x dB also reduces the cross-talk power from the transceiver for other transceivers by approximately x dB, thus improving the link quality for other transceivers while maintaining its link partner's SNR above the required level of operation.

Other embodiments include more sophisticated transmit signal pre-processing to reduce the cross-talk level at other transceivers. For example, one embodiment includes the transceiver adjusting the transmit signal waveform to reduce cross-talk while still maintaining the link partner's performance or some other parameter related to the transmit signal waveform above a threshold. To achieve this, the transmitter estimates the effect of a change in the transmitted waveform on the link partner's received signal quality. Such an estimate is possible by, for example, estimating quantities such as the SNR, bit-error-rate (BER), noise statistics, waveform responses (e.g. echo, insertion loss, etc). With this signal quality information, the transmitter can change the transmitted waveform while still ensuring that the link partner's SNR, or some other performance criteria, is above a threshold.

Pre-processing the transmitted signal waveform to decrease high-frequency components of the transmit signal tends to decrease cross-talk experienced by other transceivers. The cross-talk coupling function between transceivers is often much stronger at higher transmission frequencies. As such, reducing the transmitted power at transmission frequencies that couple strongly to other transceivers can significantly reduce the cross-talk to other transceivers. As an example embodiment, if the link partner receives a signal from the transceiver that is heavily reduced at high frequencies compared to lower frequencies, then reducing the transmit power at those higher frequencies has a small effect on the overall signal that is received by the link partner, while having a much more significant effect on the cross-talk signal that the transmitter s generates at another transceiver.

An embodiment includes independently adjusting the transmit power or a transmission signal waveform of each of the plurality of the sub-transceivers 212, 214, 216, 218. That is, the transmit waveforms are adjusted differently and/or independently for different links/wires of each of the sub-transceivers 212, 214, 216, 218 of the transceiver 210. This can include, for example, adjusting the transmit power (for example, power-back-off (PBO)) for one or more of the sub-transceivers 212, 214, 216, 218, and/or adjusting the transmit waveforms (power spectral density (PSD)) for one or more of the sub-transceivers 212, 214, 216, 218.

This approach is very useful when the sub-transceivers have different link margins and different channel characteristics, which is often the case in many communication systems using multiple sub-transceivers. Moreover, the cross-talk coupling of different sub-transceivers of a transceiver can vary significantly and so it is beneficial to reduce the transmit power or to modify the transmit waveform shape only for those sub-transceivers that have strong cross-talk coupling to other transceivers or sub-transceivers.

Another embodiment includes changing the transmitted signal power or the transmitted signal waveform to reduce the cross-talk or other harmful effects to other sub-transceivers belonging to the same transceiver. For example, the sub-transceiver's transmitter causes near-end-cross-talk (NEXT) to other sub-transceiver pairs belonging to the same transceiver. If the NEXT level is high and harms the performance of the transceiver's sub-transceivers then a sub-transceiver can reduce its transmit power or change its waveform shape to reduce the effects of NEXT on the other sub-transceivers of the transceiver.

Figure 3:
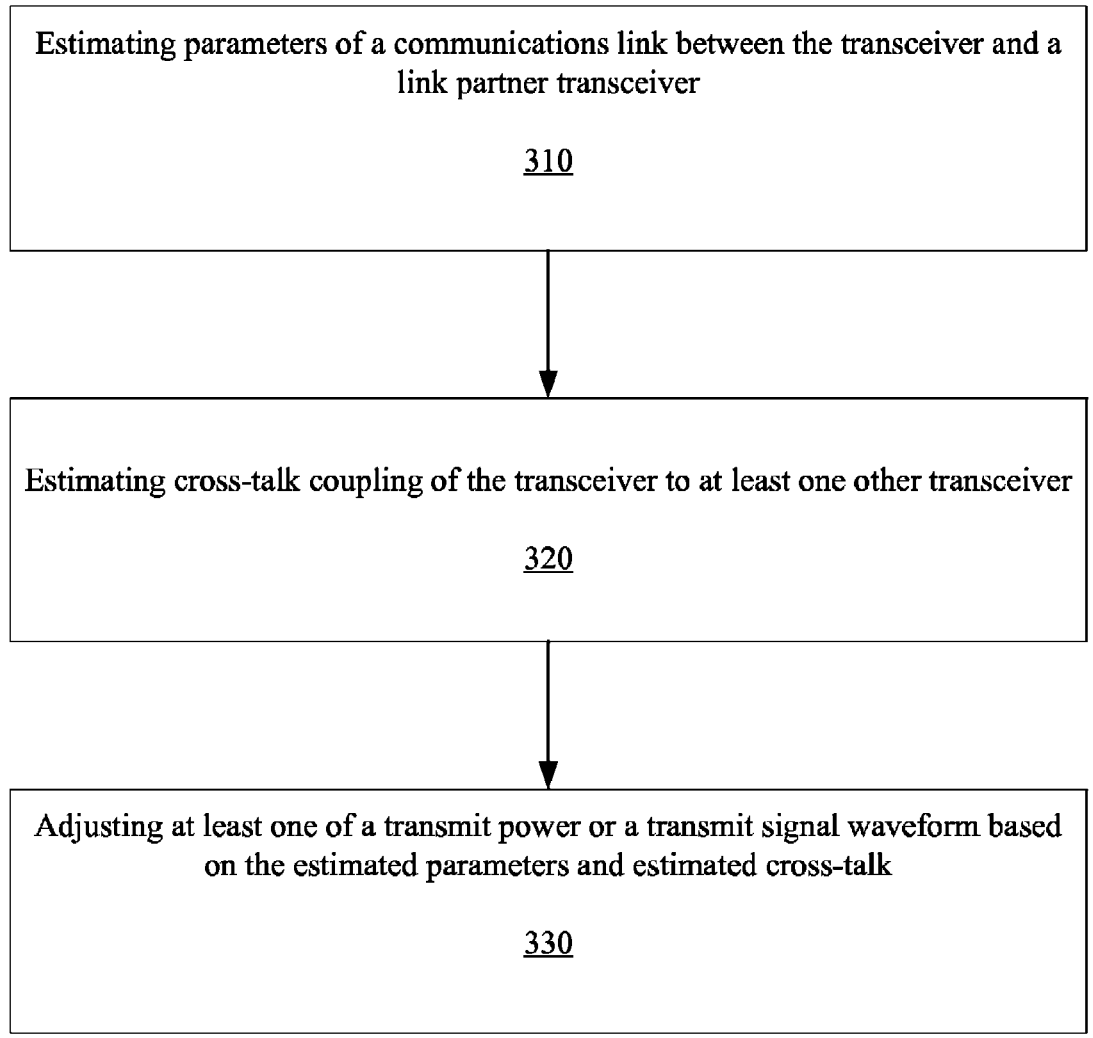
FIG. 3 is a flow chart that includes steps of an example of a method of preprocessing a transmit signal of a transceiver.

FIG. 3 is a flow chart that includes steps of an example of a method of preprocessing a transmit signal of a transceiver. A first step 310 includes estimating parameters of a communications link between the transceiver and a link partner transceiver. A second step 320 includes estimating cross-talk coupling of the transceiver to at least one other transceiver. A third step 330 includes adjusting at least one of a transmit power or a transmit signal waveform based on the estimated parameters and estimated cross-talk.

Figure 4:
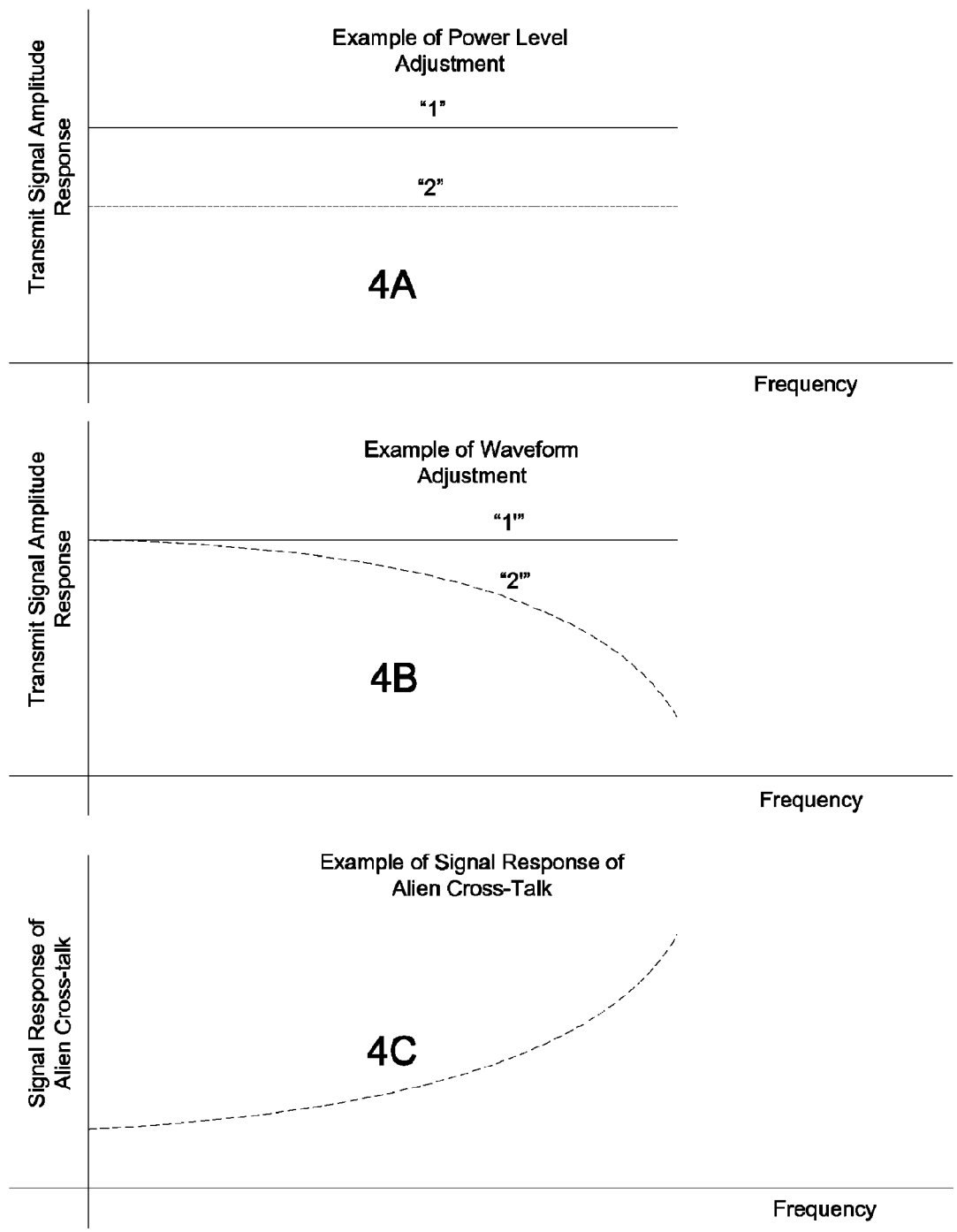
FIG. 4 shows frequency responses of transmission signals wherein the transmission power level or the transmit signal waveform have been adjusted, and a frequency response of a cross-talk signal.

FIG. 4 shows frequency responses of transmission signals wherein the transmission power level or the transmit signal waveform have been adjusted, and a frequency response of a cross-talk coupling function. The response of 4A shows an example of adjusting the transmission power. More specifically, before adjustment, transmission power level "1" is greater than transmission power level "2", and therefore, more likely to cause cross-talk than the transmission power level of "2". The response of 4B shows an example of adjusting the transmission signal waveform. The transmission signal waveform of "1" includes more high-frequency signal power than the waveform of "2", and therefore, the transmission signal waveform of "1" is more likely to cause stronger cross-talk coupling than the transmission signal waveform of "2". The response of 4C shows an example of a frequency response of a cross-talk coupling function between transceivers. As shown, the cross-talk tends to be greater for higher frequency components.

For an embodiment, estimating the parameters includes measuring signal quality parameters at the transceiver. Examples of the parameters include signal quality parameters, such as, an echo signal level, insertion loss characteristics, received waveform parameters, an interference level/signature, alien signal interference, signal to noise ratio (SNR), bit error rate (BER), alien crosstalk interference level, near-end cross-talk (NEXT), far-end cross-talk (FEXT) at the transceiver, etc.

Figure 5:
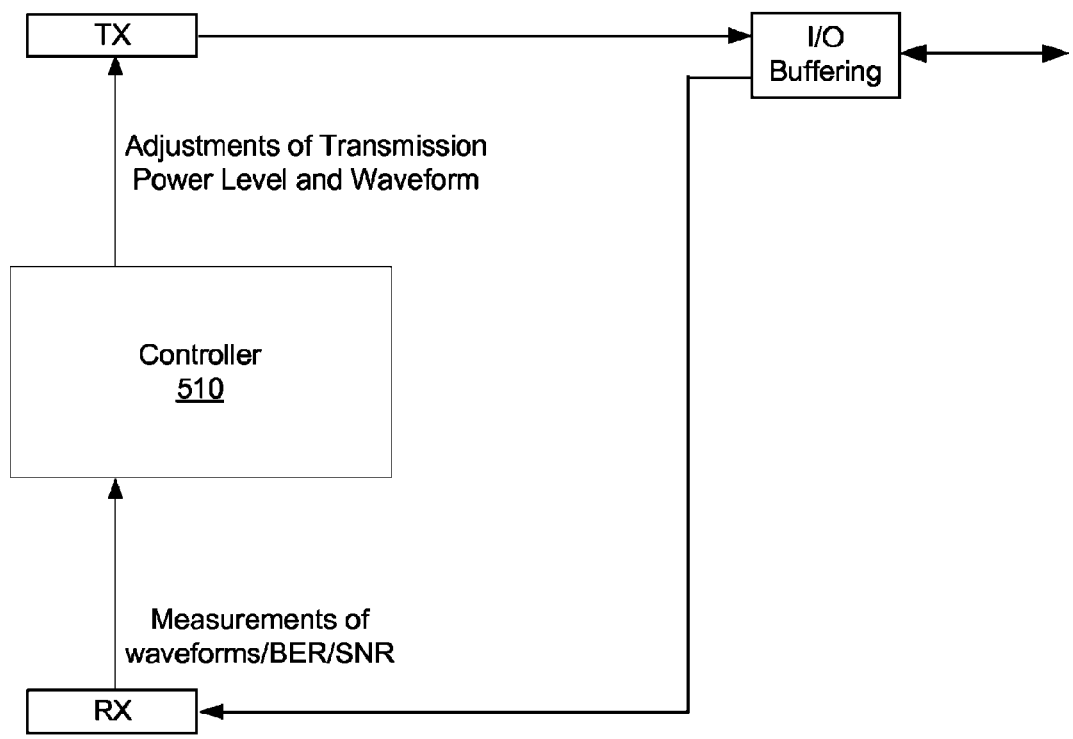
FIG. 5 is a block diagram of a transceiver that adjusts transmit power and/or a transmit signal waveform shape based on estimated received signal parameters according to an embodiment.

FIG. 5 is a block diagram of a transceiver that adjusts (changes) transmit power and/or a transmit signal waveform shape based on estimated received signal parameters. That is, at a receiver section of the transceiver, receive echo signal, bit error rate (BER), signal-to-noise-ratio (SNR) and/or cross-talk signals are measured. These quantities can be used to estimate the cross-talk parameters of cross-talk that the transmitter of the transceiver generates at another transceiver. For example, for the cross-talk signals, reciprocity can be assumed. That is, the cross-talk measured at the transceiver can be used as an estimate of the cross-talk signal interference being experienced by the transceiver that is causing the measured cross-talk. Therefore, the transceiver can adjust (through, for example, control of controller 510) its own transmit power and/or a transmit signal waveform shape based on the cross-talk measurement at its own transceiver.

Using the quantities measured at the transceiver, the transceiver can estimate the link quality parameters of the link partner transceiver. Such estimation can be based on, for example, the received waveforms of the insertion loss, echo, NEXT, FEXT signals. The insertion loss characteristics of the link are strongly coupled and the two ends of the link could experience very similar insertion loss. As such, for example, a transceiver can measure its received insertion loss, and its receiver SNR margin, and estimate the link partner's SNR margin as well.

A simple method to estimate the link partner's link quality is to use the signal quality measurements of the receive signal (BER, SNR) to assume the signal quality of signals received at the link partner of the transceiver. Incorporating all the knowledge available at the transceiver to estimate link partner's link quality could result in an even more accurate estimate of the link partner's link quality.

For another embodiment, estimating the parameters includes the link partner transceiver communicating information to the transceiver, wherein the information includes signal quality parameters measured at the link partner transceiver. The information can include, for example, SNR, BER, received waveforms information, noise information, and crosstalk information, which have been measured at the link partner transceiver.

For another embodiment, the parameters are estimated based on characteristics of the communication link, wherein the characteristics include, for example, a cable length, a cable quality, cabling configurations, a connector type, a transformer type, a cable type, and environmental conditions of a cable.

For an embodiment, adjusting the transmit power includes decreasing the transmit power if the signal quality is above a threshold. Additionally, or alternatively, the transmitter may establish whether changing (decreasing) the transmit power will degrade the link performance below an SNR or BER or link margin threshold. If there is margin, the transceiver may then change the transmit power to reduce the produced cross-talk interference. Decreasing the transmit power tends to decrease cross-talk. For another embodiment, adjusting the transmit power includes adjusting the transmit signal waveform if the signal quality is above a threshold. Decreasing high-frequency components of the transmit signal tends to decrease cross-talk. Using the information the transceiver has about the link partner's received signal quality, the transceiver can assess the impact of the waveform change on the link quality of the link partner's transceiver. For example, using an estimate of the insertion loss experienced by the link partner's transceiver, the transceiver can compute the effect of the combination of the transmit waveform change together with the link partner's insertion loss function on the signal it transmits to the link partner. Knowing the characteristics of the signal the link partner receives can be used by the transceiver to calculate the effect of the transmit waveform change on the link partner's received signal and on the link partner's SNR and BER. The transceiver can then use this information to change the transmit waveform to a new waveform that will reduce the cross-talk to another transceiver while making sure to maintain the link-partner's received signal quality above a threshold to maintain a certain link performance level.

For an embodiment, the transceiver includes a plurality of sub-transceivers. Further, an embodiment includes independently adjusting the transmit power or transmit signal waveform of each of the plurality of the sub-transceivers. That is, the transmit waveforms are adjusted differently and/or independently for different links/wires of each of the sub-transceivers of the transceiver. This can include, for example, adjusting the transmit power (for example, power-back-off (PBO)) for one or more of the sub-transceivers, and adjusting the transmit waveforms (power spectral density (PSD)) for one or more of the sub-transceivers.

Figure 6:
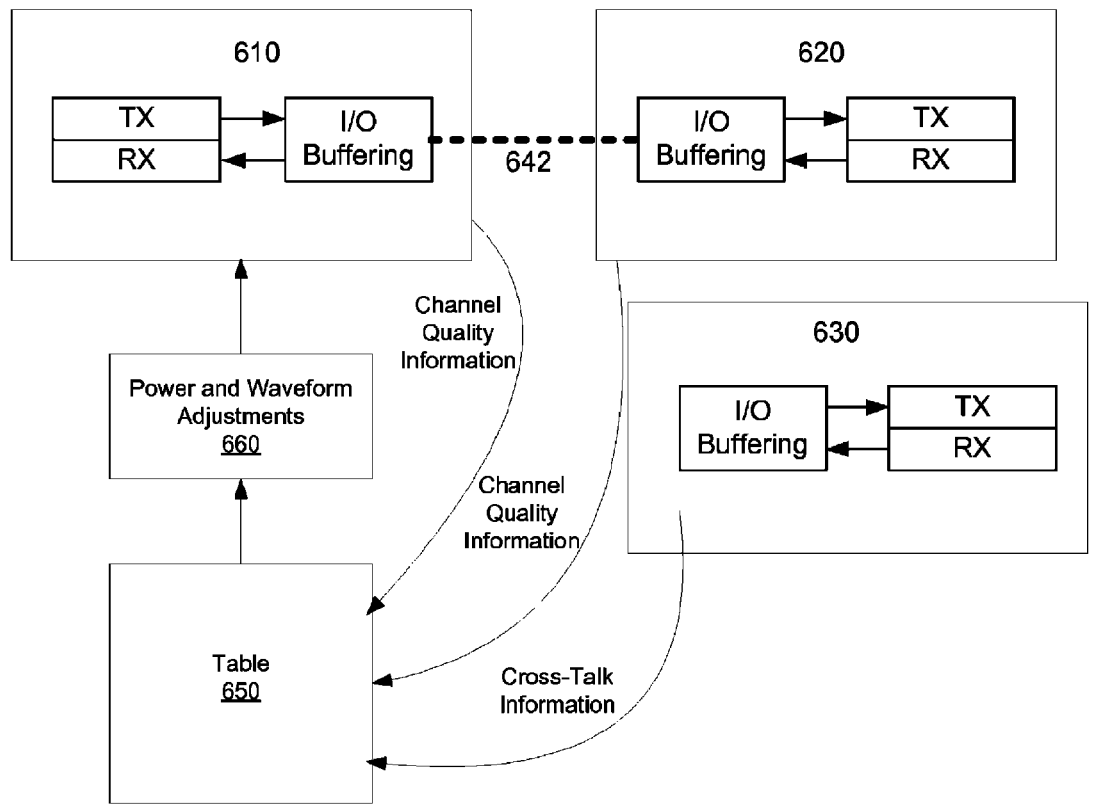
FIG. 6 shows multiple transceivers and a controller that collects channel quality and cross-talk information that are used to adjust transmit power and/or a transmit signal waveform shape of a transceiver according to an embodiment.

FIG. 6 shows multiple transceivers (or sub-transceivers) and a controller that collects channel quality information and cross-talk information that are used to adjust transmit power and/or a transmit signal waveform shape of a transceiver according to an embodiment. A sub-transceiver 610 communicates with a link partner sub-transceiver 620 through a link 642. Another proximate sub-transceiver 630 receives cross-talk interference from the sub-transceivers 610, 620. For an embodiment, a controller (which can be independent of the sub-transceivers 610, 620, 630, or can be a controller (that includes, for example, table 650) associated within any one or more of the sub-transceivers 610, 620, 630) receives cross-talk measurement information, channel quality information and/or transmission parameters, and controls transmit power and transmit signal waveform (spectrum) based on the cross-talk measurement information, channel quality information and/or transmission parameters. Based on the information within the table, the controller 660 adjusts the transmit power and transmit waveform of, for example, transceiver 610 to mitigate the cross-talk experienced, for example, by transceiver 630, while maintaining the channel quality characteristics of the transceivers 610, 620. For embodiments, the controls of transmit power and transmit signal waveform (spectrum) based on the cross-talk measurement information, channel quality information and/or transmission parameters is performed continuously over time.

An embodiment includes estimating parameters of the communications link while at least one of the sub-transceivers or at least one corresponding link partner sub-transceiver is not transmitting. For one embodiment, this includes estimating the parameters while at least one of the sub-transceivers of the transceiver is not receiving any data from a link partner sub-transceiver. This can allow high fidelity estimation of at least some cross-talk parameters. When the link partner sub-transceiver does not transmit any data, the received sub-transceiver signal's cross-talk component is more significant, thus allowing for a better measurement and estimation of the cross-talk parameters. For another embodiment, this includes estimating cross-talk parameters for the transceiver, wherein the cross-talk parameters are estimated when at least one of the sub-transceivers is not transmitting. That is, the cross-talk coupling from a set of wires (links) is estimated using the fact that there exists a state where only a single wire in a transceiver transmits training data while other subsets of the transceiver links are not transmitting.

An embodiment includes estimating the parameters by determining a representation of cross-talk present at another transceiver, and the transmit signal waveform is adjusted based on the representation of the crosstalk. This can include, for example, estimating a representation of cross-talk of the transceiver to another transceiver or sub-transceiver, and adjusting the transmit signal waveform based on the representation of the crosstalk to reduce the cross-talk to another transceiver while maintaining a link quality parameter such as SNR/BER above a threshold. For embodiments, the representation includes an estimate of cross-talk interference that the transceiver generates at another transceiver or sub-transceiver, and the representation is estimated using at least one of a formula or a table, wherein the representation is also determined based on a frequency response or an impulse response of the transmit signal waveform. For another embodiment, the representation is estimated based on cross-talk measured by the transceiver. That is, reciprocity of channel (link) is assumed. That is, it is assumed that the cross-talk measurement at the transceiver is an accurate representation of the cross-talk at the other transceiver. For another embodiment, the representation is received from another source, such as, a central controller or other transceivers. For other embodiments, the representation is estimated based on characteristics of the communications link, wherein the characteristics includes at least one of a cable type (for example, like cat5e, cat6, cat6a), a cable quality, a connector type, a cable bundling configuration, a transformer type.

Figure 7:
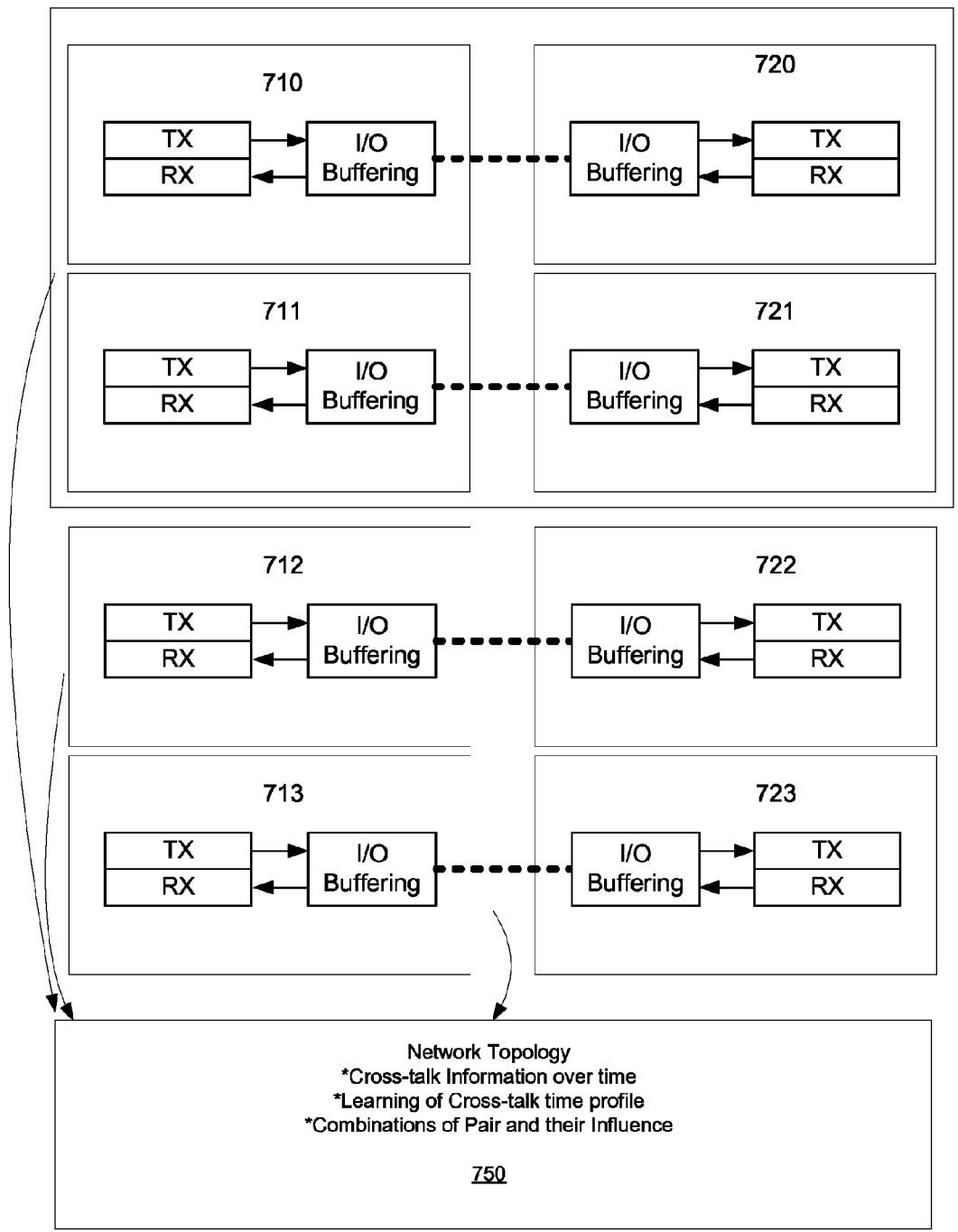
FIG. 7 is a block diagram that includes a centralized network controller that learns transceiver cross-talk patterns over time to improve cross-talk performance among a group of transceivers.

FIG. 7 is an example of a block diagram that includes a centralized network controller that learns transceiver cross-talk patterns over time to improve cross-talk performance among a group of transceivers. As shown, a transceiver (having sub-transceivers 710, 711) communicates with a link partner transceiver (having sub-transceivers 720, 721). Additionally, sub-transceiver 712 communications with link partner sub-transceiver 722, and sub-transceiver 713 communications with link partner sub-transceiver 723. Additionally, as shown, a controller 750 (which can be located within any of the transceivers or sub-transceiver, or externally as a master controller) receives channel quality, cross-talk and/or transmission characteristics from the transceivers and sub-transceivers. For an embodiment, the controller 750 learns behaviors of all of the transceivers. That is, for example, the controller 750 can monitor cross-talk information over time, thereby allowing the controller 750 to learn cross-talk time profiles including, for example, temporal patterns of the cross-talk. Additionally, pairs of transceivers and their influences on the other transceivers can be monitored and patterns identified. Therefore, the controller can more intelligently control the transmit power and/or transmission waveform characteristics of individual or pairs of transceivers or sub-transceivers to reduce the overall effects of cross-talk to the network of transceivers being controlled by the controller 750, and other transceivers not being controlled by the controller 750.

For an embodiment, the parameters are estimated over multiple instances (wherein an instance is defined as some fixed-period of time) of transmitter operation, and further includes generating and maintaining a network mapping of cross-talk information. The network mapping can be retrieved during later operation. The network map/topology with cross-talk information is created and maintained. The network map (that includes, for example, the cross-talk information) is maintained and updated through the link operation and is retained to be used for the next time the transceiver is powered (if, for example, the network was powered down for a short period of time).

Figure 8:
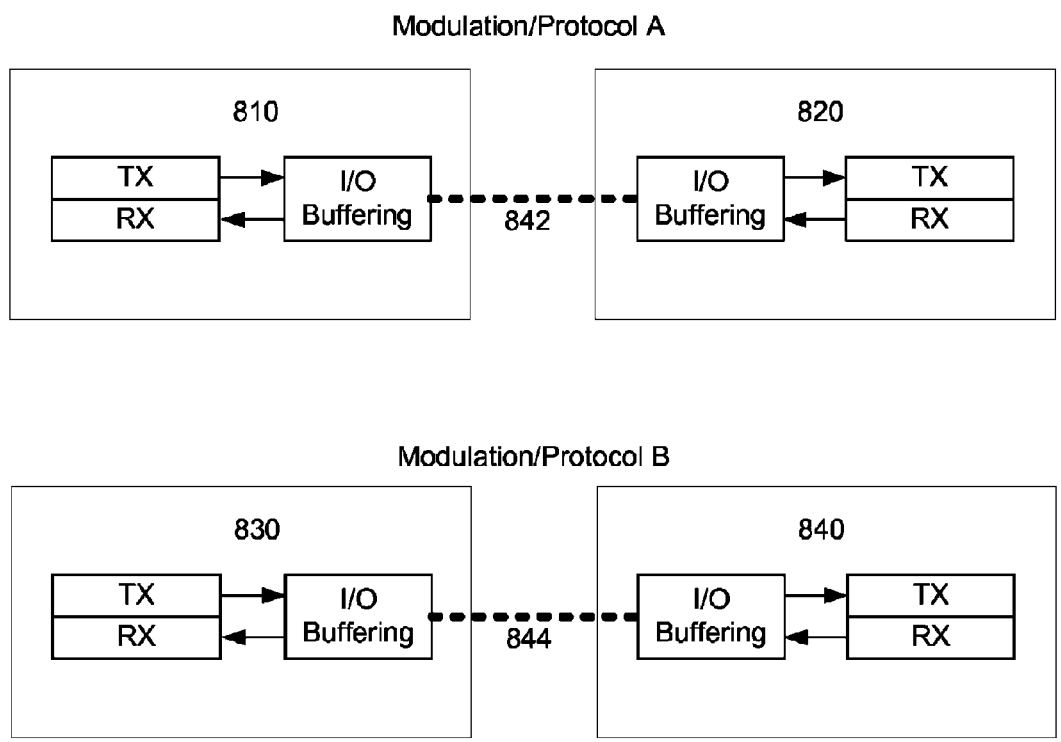
FIG. 8 shows an example of a transceiver that includes two sub-transceivers each employing a different modulation and/or transmission protocol, wherein the modulation and transmission protocols are selected to reduce cross-talk to other transceivers or sub-transceivers.

FIG. 8 shows an example of a transceiver that includes two sub-transceivers 810, 830 each employing a different modulation and/or transmission protocol, wherein the modulation and transmission protocols are selected to reduce cross-talk to another transceiver or other transceivers or sub-transceivers. Link partner sub-transceivers 820, 840 communicate with the sub-transceivers 810, 830 through links 842, 844. FIG. 8 shows sub-transceivers 810 and 820 using modulation protocol A while sub-transceivers 830 and 840 uses modulation or protocol B.

For an embodiment, the transceiver (or sub-transceiver as shown in FIG. 8) adaptively adjusts its operational transmission protocol or data rate to reduce data being transmitted. That is, it is assumed that a lower data rate of transmission will create less cross-talk for other transceivers. Therefore, when possible, the transceiver decreases its transmission data rate to operate as a good neighbor. The transmission data rate can be reduced by the transceiver changing its transmission protocol to, for example, have a lower rate, or a lower bandwidth, or a low-power mode, or dropping its data rate. For example, transmitting data less frequently in time reduces the average cross-talk the transceiver generates since it generates cross-talk less frequently in time. Likewise, changing to a transmission protocol with a modulation scheme using less bandwidth, with the same or less transmission power, reduces the cross-talk the transceiver generates as the lower bandwidth waveform, with the same or less transmission power, results in less coupling to unintended transceivers. As illustrative example, when possible, the transceiver can choose to change from a 10G BASE-T transmission to 1000 BASE-T transmission.

Another embodiment includes changing the transceiver active link protocol to run in an energy efficient manner such as, for example, the defined Energy-Efficient-Ethernet (EEE) protocol for wireline communication links. The EEE protocol modifies the transceiver to reduce the amount of time the transceiver actually transmits any data so that no power is generated to be sent over the link when there is no data to be transmitted. Such an operation reduces the cross-talk the transceiver generates since such an operation usually reduces the amount of time the transceiver transmits data, thus resulting in reducing the average cross-talk experienced by other transceivers.

For an embodiment, the transceiver (or sub-transceiver as shown in FIG. 8) adaptively adjusts its operational transmission protocol or data rate when possible to reduce data being transmitted. That is, it is assumed that a lower data rate of transmission will create less cross-talk for other transceivers. Therefore, when possible, the transceiver decreases its transmission data rate to operate as a good neighbor. The transmission data rate can be reduced by the transceiver changing its transmission protocol to, for example, have a lower rate, or a lower bandwidth, or a low-power mode, or dropping its data rate. As an example embodiment, many communication systems have independent transmit and receive channels. One such example is found for some types of backplane channels, where a transceiver has sub-transceiver used for transmitting data and a sub-transceiver used for receiving data. To reduce cross-talk to other transceivers in the vicinity, a sub-transceiver chooses to stop transmitting data on its transmitting sub-transceiver while still receiving data on its receiving sub-transceiver.

For an embodiment, the transceiver initiates a state in which the transceiver only transmits a low duty cycle periodic training sequence when the transceiver is not required to transmit data. Again, the transceiver attempts to reduce cross-talk for other transceivers. For example when the transceiver does not need to transmit data, the transceiver goes into a state wherein it only transmits a low duty cycle periodic training sequence. An embodiment further includes synchronizing in time the transceiver to other transceivers, and managing the transmission of training sequences of the transceiver and the other transceivers to reduce transmission overlap of the training sequences of the transceiver and the other transceivers. Cross-talk interference can be reduced by the transceivers being synchronized in time (in frequency and phase) so that the transceivers are able to better manage the duty cycles of training sequences to reduce the cross-talk distortion among a group of transceivers. The synchronized transceivers are able to coordinate the training sequences so that they are less likely to overlap in time.

Such training synchronization between transceivers allows a transceiver to know/estimate which other transceiver transmits at a given time, thus being able to accurately estimate the cross-talk coupling function of that transceiver to itself. Such accurate cross-talk estimation is possible because the transceiver synchronization can be made to result in only one transceiver transmitting at any given time, thus allowing the other transceivers to accurately estimate the cross-talk coupling function of that transceiver to all the other transceivers that are jointly synchronized. Since no other transceiver transmits, the only received energy for each transceiver comes from the transmitting transceiver, allowing for a high fidelity estimate of the cross-talk coupling function.

For an embodiment, adjusting the transmit signal waveform includes filtering the transmit signal waveform, wherein frequency components of the transmit signal waveform above a threshold are filtered more than frequency components of the transmit signal waveform below the threshold. That is, for a possible embodiment, the transmission signal waveform is filtered to reduce the magnitude of the high-frequency components, which reduces the possibility that the transmission signal causes cross-talk. Exemplary filtering includes finite impulse response (FIR), infinite impulse response (IIR), linear filtering, and/or non-linear filtering.

An embodiment further includes dynamically adjusting (which can additionally include measuring) at least one of a transmit power or a transmit signal waveform based on the estimated parameters, and changing the transmit power or transmit signal waveform multiple times during link operation in accordance with changes in the estimated parameters. For an embodiment, the dynamic adjusting occurs at a predetermined rate. Further, for an embodiment, the predetermined rate of dynamically adjusting includes an adjustment granularity and an adjustment time-scale. For embodiments, the predetermined rate is selected to avoid degradation of the communications link. For another embodiment, the predetermined rate is selected based on a rate that the adaptive filters of the link partner transceiver are adjusted, wherein the rate that adaptive filters of the link partner transceiver are adjusted is determined from startup information or communicated to the transceiver from the link partner transceiver. For embodiments, the predetermined rate is selected to allow the transceiver to maintain a link quality of the communications link greater than a threshold.

Many communication transceivers include the capability to adjust the transceiver parameters to be able to track and change the transceiver's settings to respond to changes in the communication environment. Such changes might be caused by environmental changes such as temperature, voltage, plant disturbances, changing noise sources, component aging, etc. A sub-component of the transceiver's tracking ability is the ability of the filters in the transceiver to be able to adjust the filter settings to respond to any changes in the communication environment which might degrade the link performance.

When the transceiver changes its transmit power or waveform, the link partner's transceiver experiences a slightly different received signal. The link partner's transceiver therefore needs to adjust its filters to accommodate the change. An example of the filters that might need to be changed includes the equalizer, FEXT, ECHO, and NEXT filters. Without changing the settings of these filters, the link partner's transceiver could suffer degradation in performance.

When the transceiver changes its waveform characteristics, it must make sure to change it at a rate such that the link-partner's settings can be changed quickly enough so that the changes do not degrade the link performance. The transceiver needs to have an estimate of how quickly the link partner's transceiver can respond to changes in the communication environment. Such information can be obtained from information exchange between the link partners or by estimating the link partner's ability based on the communication link conditions that the two transceivers use. This information can also be estimated during startup, as during the startup stage of the link establishment, the link partner's transceiver settings are initially adjusted, and the speed by which the remote partner adjusts could be used to estimate how quickly it will respond to changes. Additionally, the transceiver can initiate waveform changes during startup and learn how quickly the link partner adjusts its settings, and then estimate the required quantities.

The transceiver can implement the change in the transmitted waveform as a series of smaller changes. Each such small change in the transmitted waveform could be done such that the overall effect on the link partner's received signal is negligible and will not cause a significant degradation in link performance. After every such small transmitter waveform shape the transceiver can wait before committing the next change to make sure that the link partner had the time it needs to adjust its transceiver settings in response to the prior small change. The transmitter can then proceed with the next small transmitter waveform shape change knowing that the link partner will not suffer any serious link performance degradation, and continue in the same manner until the transmitter changes the waveform shape to accommodate its objective of reducing the cross-talk level to another transceiver without significantly affecting the link partner's performance level.

Figure 9:
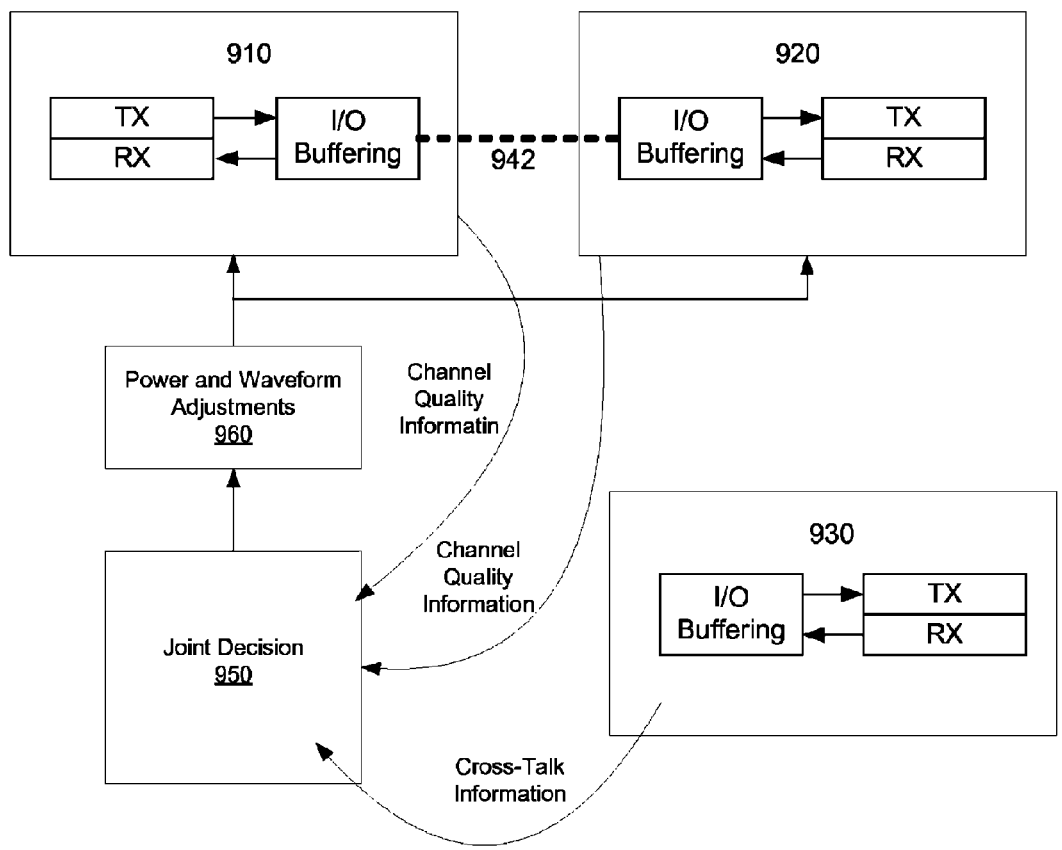
FIG. 9 is an example of block diagram of two transceivers jointly performing power and waveform adjustments to reduce the cross-talk level the transceivers cause to another transceiver, while still maintaining link qualities of the transceivers above a threshold.

Embodiments include joint decision making/coordination of the transceiver and the link partner transceiver for determining how to adjust the at least one of a transmit power or a transmit signal waveform of both transceivers based on the transceivers' estimated parameters. FIG. 9 is an example of block diagram of two transceivers jointly performing power and waveform adjustments to reduce the cross-talk level the transceivers cause to another transceiver, while still maintaining link qualities of the transceivers above a threshold. As shown, a transceiver (or sub-transceiver) 910 and a link partner transceiver 920 provide, for example, channel quality information, and another transceiver 930 provides cross-talk information to a controller 950 (located anywhere). The controller 950 makes a joint coordination decision on adjusting (960) of the transmit powers and transmit signal waveforms of both of the transceivers 910, 920.

For an embodiment, the joint processing/decision making and/or coordination includes the transceiver and the link partner transceiver sharing link characterization information and joint waveform shaping information, and the adjusting of at least one of the transmit power or the transmit signal waveform based on the estimated parameters is based on aiding a victim transceiver suffering from cross-talk from at least one of the transceiver or the link partner transceiver while maintaining a quality of the communications link above a threshold. The information sharing can include link characterization information, estimated cross-talk coupling to another transceiver (like transceiver 930 in FIG. 9), joint waveform shaping, all meant to modify both of the transceivers' transmit waveforms to help an alien victims while maintain a link quality parameters above a threshold.

An example of how such joint coordination is made is as follows. Both transceivers communicate to each other their current SNR margin and their proposed waveform changes to reduce cross-talk to other transceivers. Each transceiver then evaluates the other transceiver's waveform change and computes its own resulting SNR based on its own and the link partner's transmit waveform changes. If both transceivers' SNR margin is sufficient with the proposed changes, then they both proceed with the proposed waveform changes to reduce the cross-talk to other transceivers. Otherwise, if any of the transceivers computes its own resulting SNR to be insufficient, it communicates this to the link partner and asks it to propose a waveform change that results in a smaller SNR or performance degradation. This process can continue until both transceivers deem the waveform change of the link partner to result in an acceptable SNR performance degradation level.

Another example of joint coordination making is the two transceivers coordinating their waveform shape such that each of them reduces the cross-talk they cause to some other third transceiver by a certain amount. This coordination allows each transceiver to slightly reduce its cross-talk coupling while the victim transceiver will experience a significant performance improvement because two transceivers have reduced the cross-talk to that transceiver.

Many other joint coordination making and coordination methods are possible, including but not limited to, jointly changing the transmitted waveform shapes to achieve a certain cross-talk frequency domain profile, joint transmit power reduction, joint coordination of sub-transceiver waveform shape changes for both transceivers, etc.

An embodiment includes the link partner transceiver indicating to the transceiver a desired signal shaping or transmit pre-coding based on the effects of cross-talk coupling from other transceivers. More specifically, this includes the remote receiver (link partner transceiver) indicating to the transceiver a desired signal shaping or a pre-coding such as, for example, the known technique of Tomlinson-Harashima Precoding (THP) or the technique of transmitter pre-equalization filter (PEF). For embodiments, the pre-coding is designed in such a way that receiver processing of the link partner transceiver is improved to provide a reduction of the effects of cross-talk coupling from other transceivers or devices to the link partner transceiver.

Figure 10:
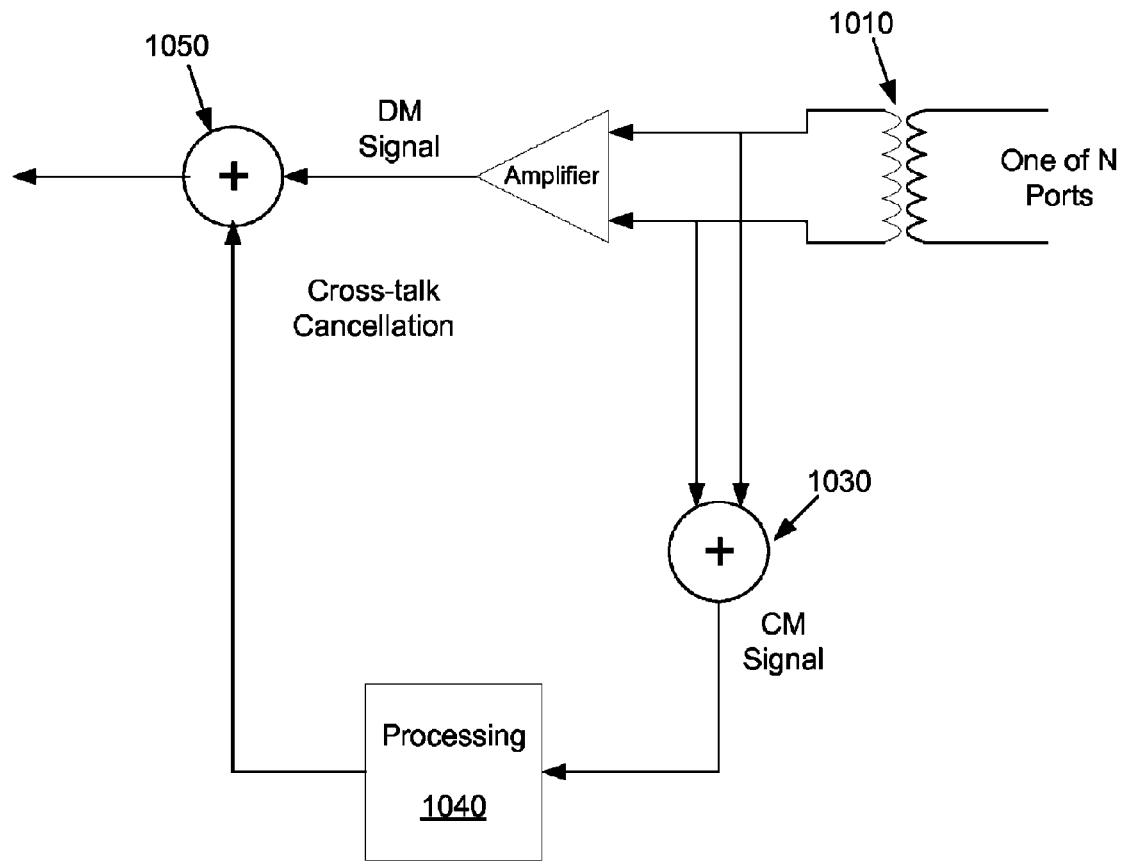
FIG. 10 is an example of a block diagram of a transceiver that senses cross-talk from a common-mode signal, processes the sensed common mode signal to estimate the received cross-talk, and then cancels it from the signal from which the data transmitted by the link partner is extracted.

An embodiment includes the transceiver sensing cross-talk signals. Further, the transceiver processes the sensed cross-talk signals; and cancels cross-talk signals hurting the performance of the transceiver with the processed and sensed cross-talk signals. For example, the transceiver can sense the alien cross-talk interference through a differential analog to digital converter (ADC) that extracts a common-mode (CM) signal from the transmission medium, and cancels the cross-talk interference to improve the receiver performance. An example embodiment is shown in FIG. 10, where a CM signal is extracted from the differential transmission medium using a summer 1030. The CM signal is then processed with a processor 1040. Such processing could include filtering and other signal transformations that would extract an estimate of the cross-talk signal that is desired to remove from the differential mode (DM) signal 1050 to improve the receiver's performance. For this embodiment, the received signal goes through a transformer 1010 and, the DM signal is amplified prior to the subtraction of the estimated cross-talk signal to reduce the interference afflicting the DM signal.

A Network of Devices

Figure 11:
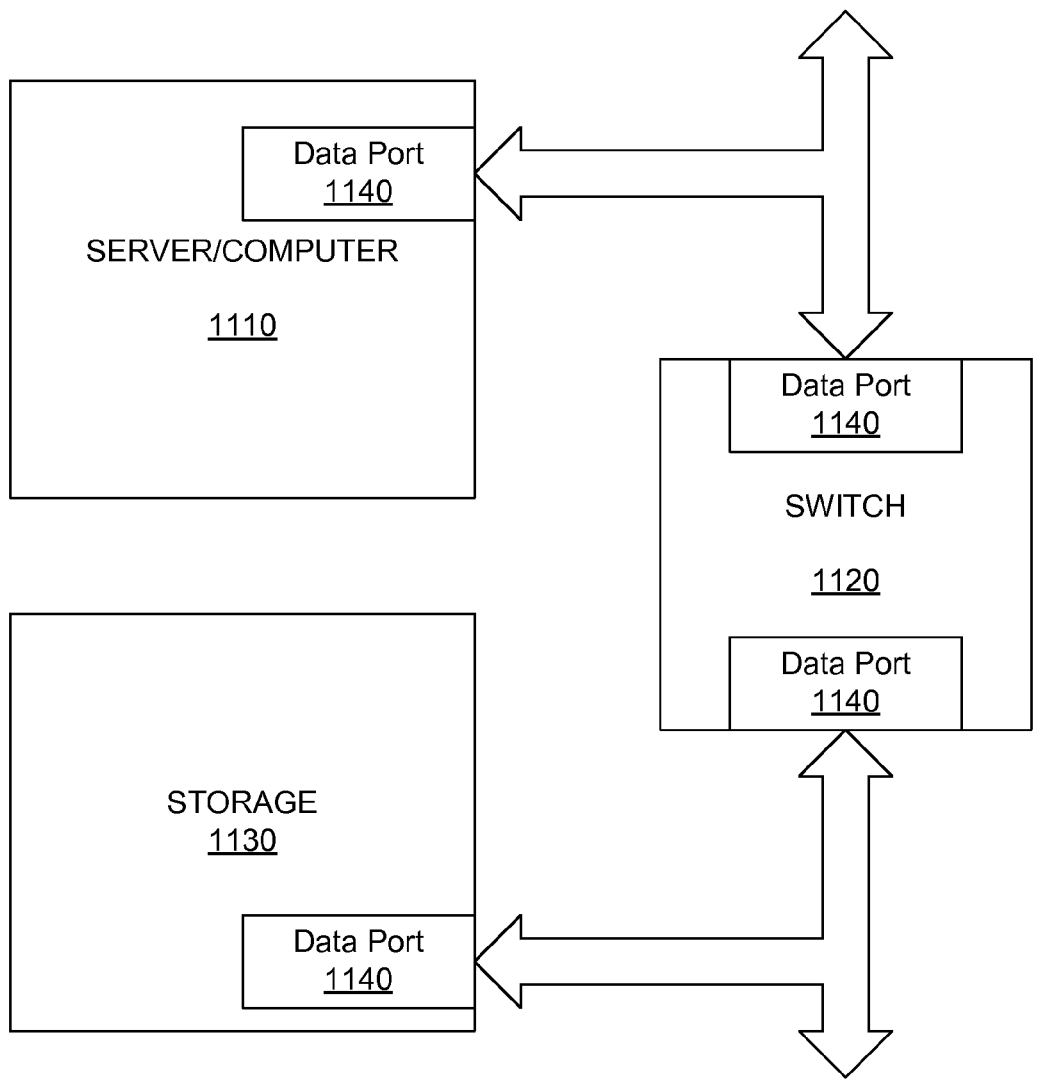
FIG. 11 shows devices connected to an Ethernet network that can include embodiments of reducing cross-talk between transceivers of the devices.

FIG. 11 shows devices connected to an Ethernet network that can include embodiments of reducing cross-talk interference between transceivers. The network includes a server/computer 1110, a switch 1120 and storage 1130 that can all benefit from reducing cross-talk interference between transceivers 1140. The server/computer 1110 can be connected to the switch 1120 through an Ethernet twisted pair LAN connection. The switch 1120 can additionally be connected to the storage 1130 through an Ethernet twisted pair LAN connection.

Although specific embodiments of the invention have been described and illustrated, the invention is not to be limited to the specific forms or arrangements of parts so described and illustrated. The invention is limited only by the appended claims.

What is claimed:

1. A method of preprocessing a transmit signal for transmission by a sub-transceiver of an Ethernet transceiver, the Ethernet transceiver including a plurality of the sub-transceivers, the method comprising:
exchanging parameters of a communication link between the Ethernet transceiver and a link partner transceiver;
estimating cross-talk coupling of the Ethernet transceiver to at least one other transceiver;
adjusting at least one of a transmission protocol or a data rate based on the exchanged parameters; and
independently adjusting a transmit power level of each of the plurality of the sub-transceivers based on the parameters, the adjusted transmission protocol or data rate, and estimated cross-talk.

2. The method of claim 1, wherein exchanging the parameters comprises measuring signal quality parameters at the Ethernet transceiver and the link partner transceiver.

3. The method of claim 1, wherein exchanging the parameters comprises the link partner transceiver communicating information to the Ethernet transceiver, and the Ethernet transceiver communicating information to the link partner transceiver.

4. The method of claim 1, wherein the exchanged parameters are based on characteristics of the communication link, wherein the characteristics comprise at least one of a cable length, a cable quality, cabling configurations, a connector type, a transformer type, a cable type, and environmental conditions of a cable.

5. The method of claim 1, wherein adjusting the transmit power comprises changing the transmit power level if the signal quality is above a threshold.

6. The method of claim 1, wherein exchanging parameters of the communication link comprises estimating the parameters while at least one of the sub-transceivers or at least one corresponding link partner sub-transceiver is not transmitting.

7. The method of claim 1, further comprising estimating cross-talk parameters of the Ethernet transceiver, wherein the cross-talk parameters are estimated when at least one of the sub-transceivers is not transmitting.

8. The method of claim 1, wherein exchanging the parameters comprises determining a representation of cross-talk at another transceiver, and adjusting the transmit power level based on the representation of the crosstalk.

9. The method of claim 8, wherein the representation comprises an estimate of cross-talk interference the Ethernet transceiver generates at another transceiver or at another sub-transceiver, and the representation is estimated using at least one of a formula or a table, wherein the representation is also determined based on a frequency response or an impulse response of the transmit signal waveform.

10. The method of claim 8, wherein the representation is estimated based on cross-talk measured by the Ethernet transceiver.

11. The method of claim 8, wherein the representation is received from another source.

12. The method of claim 8, wherein the representation is estimated based on characteristics of the communication link, wherein the characteristics comprise at least one of a cable type, a cable quality, a connector type, a cable bundling configuration, a transformer type.

13. The method of claim 1, wherein the parameters are exchanged over multiple instances of transceiver operation, and further comprising generating and maintaining a network mapping of cross-talk information, and a retrieving of the network mapping during later operation.

14. The method of claim 1, wherein the adjusting comprises adaptively adjusting at least one of the transmission protocol or the data rate.

15. The method of claim 1, further comprising the Ethernet transceiver initiating a state in which the transceiver only transmits a low duty cycle training sequence when the Ethernet transceiver is not transmitting data.

16. The method of claim 1, further comprising synchronizing the Ethernet transceiver to other transceivers, and managing transmission of training sequences of the Ethernet transceiver and the other transceivers to reduce transmission overlap of the training sequences of the Ethernet transceiver and the other transceivers.

17. The method of claim 1, further comprising measuring and dynamically adjusting the transmit power level based on the exchanged parameters, and further comprising changing the transmit power level during link operation in accordance with changes in the exchanged parameters.

18. The method of claim 17, wherein the dynamic adjusting comprises adjusting at a predetermined rate.

19. The method of claim 18, wherein the predetermined rate of dynamically adjusting includes an adjustment granularity and an adjustment time-scale.

20. The method of claim 18, wherein the predetermined rate is selected to avoid degradation of the communication link.

21. The method of claim 18, wherein the predetermined rate is selected based on a rate that adaptive filters of the link partner transceiver are adjusted, wherein the rate that adaptive filters of the link partner transceiver are adjusted is determined from startup information or communicated to the Ethernet transceiver from the link partner transceiver.

22. The method of claim 18, wherein the predetermined rate is selected to allow the Ethernet transceiver to maintain a link quality of the communication link greater than a threshold.

23. The method of claim 1, further comprising joint coordination of the Ethernet transceiver and the link partner transceiver for determining how to adjust the at least one of a transmit power or a transmit signal waveform of both transceivers based on the estimated parameters of at least one of the transceivers.

24. The method of claim 23, wherein the joint coordination comprises the Ethernet transceiver and the link partner transceiver sharing link information and joint waveform shaping information, and the adjusting of at least one of the transmit power or the transmit signal waveform based on the estimated parameters is based on aiding a victim transceiver suffering from cross-talk from at least one of the transceiver or the link partner transceiver while maintaining a quality of the communication link above a threshold.

25. The method of claim 1, further comprising the link partner transceiver indicating to the Ethernet transceiver a desired signal shaping or pre-coding based on effects of cross-talk coupling from other transceivers.

26. The method of claim 1, further comprising:
the Ethernet transceiver sensing cross-talk signals;
the Ethernet transceiver processing the sensed cross-talk signals; and
the Ethernet transceiver cancelling coupled cross-talk signals at the Ethernet transceiver with the processed sensed cross-talk signals.

27. A method of preprocessing a transmit signal of an Ethernet transceiver having a plurality of sub-transceivers, the method comprising:
- exchanging parameters of a communication link between the Ethernet transceiver and a link partner transceiver;
- adjusting at least one of a transmission protocol or a data rate based on the exchanged parameters;
- independently adjusting a transmit power level for each of the sub-transceivers based on the exchanged parameters and the adjusted transmission protocol or data rate; and
- estimating cross-talk coupling between sub-transceivers during states of operation of the Ethernet transceiver when a subset of the sub-transceivers is transmitting.

28. An Ethernet transceiver, comprising:
- a receiver for obtaining parameters of a communication link between the Ethernet transceiver and a link partner transceiver;
- the receiver obtaining cross-talk coupling information of the Ethernet transceiver to at least one other transceiver;
- the receiver adjusting at least one of a transmission protocol or a data rate based on the information;
- a controller operative to adjust a transmit power level based on the estimated parameters, the adjusted transmission protocol or data rate, and cross-talk; and
- wherein the Ethernet transceiver includes a plurality of sub-transceivers, and wherein each of the plurality of the sub-transceivers independently adjusts the transmit power level.

29. The Ethernet transceiver of claim 28, wherein the receiver obtains the parameters of the communication link by estimating the parameters while at least one of the sub-transceivers or at least one corresponding link partner sub-transceiver is not transmitting.

30. The Ethernet transceiver of claim 28, wherein the receiver estimates the parameters over multiple instances of transceiver operation, and wherein the controller is operative to generate and maintain a network mapping of cross-talk information, and a retrieving of the network mapping during later operation.

31. The Ethernet transceiver of claim 28, further comprising the transceiver initiating a state in which the transceiver only transmits a low duty cycle training sequence when the Ethernet transceiver is not transmitting data.

32. The Ethernet transceiver of claim 28, further comprising synchronizing the Ethernet transceiver to other transceivers, and managing transmission of training sequences of the Ethernet transceiver to reduce transmission overlap of the training sequences of the Ethernet transceiver and training sequences of other transceivers.

33. The Ethernet transceiver of claim 28, further comprising measuring and dynamically adjusting a transmit power level based on the estimated parameters, and further comprising changing the transmit power during link operation in accordance with changes in the estimated parameters.

* * * * *